United States Patent
Leeratanaphanit et al.

(10) Patent No.: US 12,540,932 B2
(45) Date of Patent: Feb. 3, 2026

(54) METHOD OF ANALYZING A FUNCTIONAL LAYER OF AN ELECTROCHEMICAL CELL OR AN ELECTROCHEMICAL SENSOR APPLICATION

(71) Applicant: Greenerity GmbH, Hanau-Wolfgang (DE)

(72) Inventors: Sarayut Leeratanaphanit, Offenbach am Main (DE); Matthias Binder, Gelnhausen (DE); Jens-Peter Suchsland, Alzenau (DE)

(73) Assignee: Greenerity GmbH, Hanau-Wolfgang (DE)

( * ) Notice: Subject to any disclaimer, the term of this patent is extended or adjusted under 35 U.S.C. 154(b) by 874 days.

(21) Appl. No.: 17/787,736

(22) PCT Filed: Dec. 16, 2020

(86) PCT No.: PCT/EP2020/086474
§ 371 (c)(1),
(2) Date: Jun. 21, 2022

(87) PCT Pub. No.: WO2021/130080
PCT Pub. Date: Jul. 1, 2021

(65) Prior Publication Data
US 2023/0077313 A1    Mar. 9, 2023

(30) Foreign Application Priority Data
Dec. 23, 2019    (DE) .......................... 102019220561.5

(51) Int. Cl.
*G01N 33/00* (2006.01)
*G01N 27/416* (2006.01)
*H01M 8/04664* (2016.01)

(52) U.S. Cl.
CPC ....... *G01N 33/007* (2013.01); *G01N 27/4163* (2013.01); *G01N 33/0027* (2013.01); *H01M 8/04671* (2013.01)

(58) Field of Classification Search
CPC ............. G01N 33/007; G01N 27/4163; G01N 33/0027; G01N 27/40; G01N 27/403;
(Continued)

(56) References Cited

U.S. PATENT DOCUMENTS 3,811,317 A    5/1974    Leonard et al.
6,568,282 B1    5/2003    Ganzi
(Continued)

FOREIGN PATENT DOCUMENTS

CN    102906561 A    1/2013
CN    202942816 U    5/2013
(Continued)

OTHER PUBLICATIONS

International Search Report dated Apr. 1, 2021 in counterpart International Application No. PCT/EP2020/086474.
(Continued)

*Primary Examiner* — Jennifer Wecker
*Assistant Examiner* — Britney N. Washington
(74) *Attorney, Agent, or Firm* — DLA Piper LLP (US)

(57)    ABSTRACT

A method of analyzing a functional layer of an electrochemical cell or an electrochemical sensor application includes conveying a predefined amount of test gas to a first surface of the functional layer, and quantitatively determining an amount of test gas that has passed through the functional layer using a detection unit located on a second surface of the functional layer, which second surface is opposite the first surface of the functional layer, wherein the test gas conveyed to the first surface of the functional layer is provided in a test gas chamber arranged on the first surface
(Continued)

of the functional layer, characterized in that the test gas chamber is open towards the first surface of the functional layer and has an opening which has a defined length in the longitudinal direction (X) of the functional layer and a variably adjustable width in the transverse direction (Z).

10 Claims, 1 Drawing Sheet

(58) Field of Classification Search
CPC ........... H01M 8/04671; H01M 4/8605; H01M 8/1004; H01M 2008/1095; Y02E 60/50; B01D 65/102
See application file for complete search history.

(56) References Cited

U.S. PATENT DOCUMENTS

| | | | |
|---|---|---|---|
| 7,594,425 B2* | 9/2009 | Lewnard | B01D 53/228 73/40 |
| 7,972,515 B1 | 7/2011 | Mangum et al. | |
| 2003/0074954 A1 | 4/2003 | Engle et al. | |
| 2006/0230816 A1* | 10/2006 | Buerkle | G01M 3/20 73/159 |
| 2010/0221837 A1 | 9/2010 | Uchiyama | |
| 2012/0103252 A1* | 5/2012 | Watanabe | B65H 23/0324 118/58 |
| 2014/0223999 A1 | 8/2014 | Graehlert et al. | |
| 2016/0161555 A1 | 6/2016 | Wei et al. | |
| 2017/0212070 A1 | 7/2017 | Lee et al. | |
| 2018/0057785 A1 | 3/2018 | Cahan et al. | |

FOREIGN PATENT DOCUMENTS

| | | |
|---|---|---|
| CN | 103920397 A | 7/2014 |
| CN | 105102953 A | 11/2015 |
| CN | 206573520 U | 10/2017 |
| CN | 109540905 A | 3/2019 |
| DE | 23 10 487 A1 | 9/1973 |
| DE | 10 2007 026 073 A1 | 11/2008 |
| EP | 2 781 905 A1 | 9/2014 |
| JP | S62-96838 A | 5/1987 |
| JP | 2000-214069 A | 8/2000 |
| JP | 2004-033497 A | 2/2004 |
| JP | 2005-098920 A | 4/2005 |
| JP | 2006-510885 A | 3/2006 |
| JP | 2006-349365 A | 12/2006 |
| JP | 2007-237073 A | 9/2007 |
| JP | 2011-072958 A | 4/2011 |
| KR | 10-2010-0017589 A | 2/2010 |
| KR | 2016-0022027 A | 2/2016 |
| WO | 87/02771 A1 | 5/1987 |
| WO | 01/36938 A1 | 5/2001 |
| WO | 2007/140714 A1 | 12/2007 |
| WO | 2018/156223 A1 | 8/2018 |

OTHER PUBLICATIONS

Written Opinion dated Apr. 1, 2021 in counterpart International Application No. PCT/EP2020/086474.
Examiner Requisition dated Jun. 9, 2023, of counterpart Canadian Patent Application No. 3,162,839.
Notice of Reasons for Rejection dated Jul. 4, 2023, of counterpart Japanese Patent Application No. 2022-539077, along with an English translation.
English Translation of First Office Action dated Jul. 6, 2023, of counterpart Chinese Patent Application No. 202080089679.X.
Notification for Reasons for Rejection dated Oct. 17, 2023, of counterpart Japanese Patent Application No. 2022-539077, along with an English translation.
Notification to Grant Patent Right for Invention dated Feb. 19, 2024, of corresponding Chinese Patent Application No. 202080089679.X.
Written Decision on Registration dated Jul. 25, 2025, of counterpart Korean Patent Application No. 10-2022-7021665.

* cited by examiner

METHOD OF ANALYZING A FUNCTIONAL LAYER OF AN ELECTROCHEMICAL CELL OR AN ELECTROCHEMICAL SENSOR APPLICATION

TECHNICAL FIELD

This disclosure relates to a method of analyzing defects in a functional layer of an electrochemical cell or an electrochemical sensor application.

BACKGROUND

In the quality control of membranes, catalyst layers or catalyst-coated membranes of electrochemical cells, visual checks are carried out, for example, to detect defects in the membranes or catalyst layers. A disadvantage of visual checks is that defects can often only be found on the visible surface of the layers and, for example, defects inside the layers remain undetected, for example, defects that include increased gas permeability.

It could therefore be helpful to provide a method of analyzing a functional layer of an electrochemical cell or an electrochemical sensor application that reliably detects defects in the entire functional layer, can be used quickly and easily and requires little technical effort, as well as to provide a device that carries out the method, the device being characterized by a simple design and thus by uncomplicated handling.

SUMMARY

We provide a method of analyzing a functional layer of an electrochemical cell or an electrochemical sensor application including conveying a predefined amount of test gas to a first surface of the functional layer, and quantitatively determining an amount of test gas that has passed through the functional layer using a detection unit located on a second surface of the functional layer, which second surface is arranged opposite the first surface of the functional layer, wherein the test gas conveyed to the first surface of the functional layer is provided in a test gas chamber arranged on the first surface of the functional layer, characterized in that the test gas chamber is open towards the first surface of the functional layer and has an opening which has a desired length in the longitudinal direction (X) of the functional layer and a variably adjustable width in the transverse direction (Z).

We also provide a device that carries out the method of analyzing a functional layer of an electrochemical cell or an electrochemical sensor application including conveying a predefined amount of test gas to a first surface of the functional layer, and quantitatively determining an amount of test gas that has passed through the functional layer using a detection unit located on a second surface of the functional layer, which second surface is arranged opposite the first surface of the functional layer, wherein the test gas conveyed to the first surface of the functional layer is provided in a test gas chamber arranged on the first surface of the functional layer, characterized in that the test gas chamber is open towards the first surface of the functional layer and has an opening which has a desired length in the longitudinal direction (X) of the functional layer and a variably adjustable width in the transverse direction (Z), including a test gas chamber that conveys a predefined amount of test gas to a first surface of a functional layer, and a detection unit that quantitatively determines the amount of test gas that has passed through the functional layer, wherein the test gas chamber is arranged on the first surface of the functional layer and the detection unit on a second surface of the functional layer, which second surface is opposite the first surface of the functional layer, characterized in that the test gas chamber is open towards the first surface of the functional layer and has an opening that has a defined length in the longitudinal direction (X) of the functional layer and a variably adjustable width in the transverse direction (Z).

Figure 1:
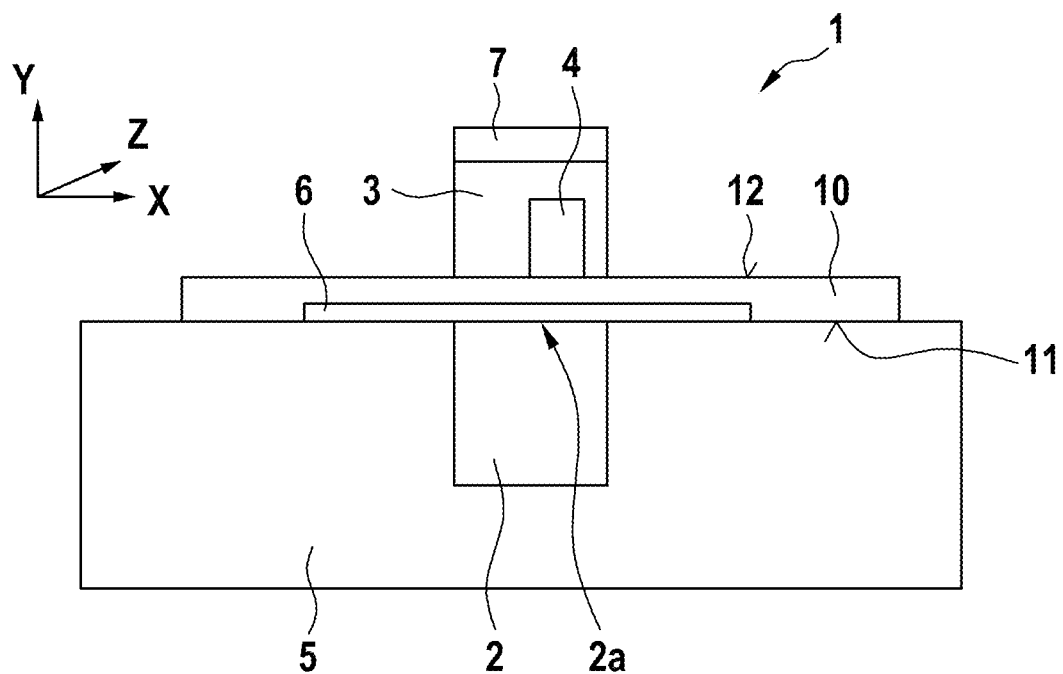
FIG. 1 shows a schematic side view of a device according to a first example.

LIST OF REFERENCE SIGNS 1 device
2 test gas chamber
2a opening
3 detection unit
4 mass spectrometry
5 transport device
6 lateral guidance
7 suction device
8 fixed roller core
8a guide roll
8b guide roll
9 porous casing
10 functional layer
11 first surface of the functional layer
12 second surface of the functional layer
X longitudinal direction
Y layer thickness direction
Z transverse direction

DETAILED DESCRIPTION

Our method of analyzing a functional layer of an electrochemical cell or an electrochemical sensor application includes:
i) conducting a predefined amount of test gas to a first surface of the functional layer, and
ii) quantitatively determining the amount of test gas that has passed through the functional layer using a detection unit that is arranged on a second surface of the functional layer, which second surface is opposite the first surface of the functional layer.

The method deals in particular with the analysis of defects such as holes, density differences, perforations or cracks that can occur in a functional layer of an electrochemical cell or an electrochemical sensor application. For example, the functional layer can be a catalyst layer, a membrane, a catalyst-coated membrane or a composite comprising a catalyst-coated membrane, a polymer film and a gas diffusion layer, with the functional layer being used in particular in fuel cell applications, electrolysis cell applications or electrochemical sensor applications. An electrochemical sensor application means, for example, a carbon monoxide detector or a hydrogen detector which makes use of an electrochemical reaction.

The functional layer has a first surface that can also be referred to as the bottom side, and a second surface that can be referred to as the top side. The first surface and the second surface are flat and lie opposite one another in the layer thickness direction. The first and second surfaces thus form the outsides of the functional layer.

In a first method step, a predefined amount of test gas is conveyed to the first surface of the functional layer. The test gas passes through the functional layer by diffusion and exits the functional layer on the second surface of the functional layer.

The amount of test gas that has passed through the functional layer is then determined quantitatively by a detection unit arranged on the second surface of the functional layer, which second surface is opposite the first surface of the functional layer. The detection unit is not limited in detail and can include any detection unit that enables a quantitative determination of the test gas. Advantageously, the detection unit is attached locally to the second surface such that it lies opposite the test gas flow stream that is conducted to the first surface. In this way, test gas losses caused by diffusion can be minimized. However, the detection unit is preferably not permanently connected to the second surface, but is only in contact with the second surface.

The diffusion of test gas through a functional layer, i.e., through the cross section of a functional layer of an electrochemical cell or an electrochemical sensor application, is a characteristic of the homogeneity of the functional layer. For example, test gas will pass through a hole in the functional layer, or a location of reduced density or reduced thickness in the functional layer, faster and more completely than through a defect-free functional layer. The quantitatively determined amount of test gas, which is based on a predefined amount of test gas conveyed to the first surface of the functional layer, is therefore reliable proof of the possible presence of a defect in the functional layer. If necessary, the time allowed for the passage of the predefined amount of test gas through the functional layer can also be included in the analysis.

Advantageously, the predefined amount of test gas can first be passed through a defect-free area of a functional layer and then the detection unit can determine quantitatively how much, and over what time frame, test gas has passed through the functional layer and has escaped from it at the second surface of the functional layer. These values can be used as calibration values or reference values. If, in one example, less test gas (possibly per unit of time) passes through the functional layer than specified by the comparison value, this indicates an increased density or the presence of a gas-impermeable foreign body in the examined area of the functional layer. If, in another example, more test gas (possibly per unit of time) passes through the functional layer than specified by the comparison value, this indicates a defect, i.e., a point with reduced density, with a reduced cross section, a hole or a crack.

By quantitatively determining a predefined amount of test gas that has passed through a functional layer, a method of analyzing the functional layer is provided that can be used quickly, easily and without great technical effort, thereby enabling any defects in the functional layer to be reliably detected. The amount of test gas that has passed through the functional layer as determined by the detection unit can be displayed, for example, via a display device.

Advantageously, the test gas conveyed to the first surface of the functional layer may be provided in a test gas chamber arranged on the first surface of the functional layer. The test gas chamber is a closed area which is only open to the first surface of the functional layer while the method is being carried out, except for any test gas being fed into the test gas chamber. The test gas chamber ensures that the test gas is conveyed directly to the first surface of the functional layer and does not diffuse away before passing through the functional layer. This also prevents other gases other than the test gas from coming in.

The test gas chamber has a predefined volume and an opening that has a defined length in the longitudinal direction of the functional layer. The longitudinal direction of the functional layer means an extension of the functional layer that extends in the X direction, according to the Cartesian coordinate system, perpendicular to the layer thickness direction. In addition, the opening of the test gas chamber has a variably adjustable width that extends in the transverse direction of the functional layer. The transverse direction of the functional layer means an extension of the functional layer that extends in the Z direction, according to the Cartesian coordinate system, perpendicular to the layer thickness direction and also perpendicular to the longitudinal direction. A predefined amount of test gas from the test gas chamber can thus be conveyed from the test gas chamber to the first surface of the functional layer in a very precisely adjustable manner.

It is also advantageous for the functional layer to be provided on a transport device. In particular, a conveyor belt that moves the functional layer horizontally can advantageously be used as the transport device. The transport device is arranged between the detection unit and the test gas chamber, more precisely between the functional layer and the test gas chamber or between the functional layer and the detection unit so that the functional layer can be moved or conveyed between the test gas chamber and the detection unit. So that the test gas can pass through the functional layer as intended, the transport device has a recess which has the same dimensions as the opening of the test gas chamber directed towards the first surface, the opening being defined by the length in the longitudinal direction and the width in the transverse direction of the test gas chamber.

Further advantageously, the functional layer may be passed between the test gas chamber and the detection unit continuously by the transport device, in particular at a speed of 0.2 m/min to 50 m/min. The continuous transport of the functional layer between the test gas chamber and the detection unit enables a continuous analysis of the functional layer, in particular when the functional layer is in the form of an elongated web. A transport speed of 0.2 m/min and 50 m/min also enables a fast but also reliable analysis over the entire length of the functional layer.

To avoid errors when determining the amount of test gas that has passed through the functional layer, the functional layer is preferably sucked onto the transport device using a vacuum. Thus, air gaps between the functional layer and the transport device that could favor escape of test gas by diffusion before the test gas passes through the functional layer can be avoided. For this purpose, the transport device is in particular porous, i.e., it is provided with openings onto which a vacuum device can be connected or arranged.

According to a further example, the functional layer is guided over a fixed roller core on which a movable, porous casing is arranged through which the functional layer can be sucked in by a vacuum. The test gas chamber is arranged on the fixed roller core, in particular such that the opening of the test gas chamber is aligned with the surface of the roller core over which the functional layer on the porous casing passes. Thus, in this example too, the opening of the test gas chamber is in direct contact with the first surface of the functional layer to which the predefined amount of test gas is conveyed.

To enable a certain prestressing of the functional layer, the functional layer is advantageously guided over at least one further guide roll, as a result of which measurement inaccuracies can be prevented.

Further advantageously, the functional layer can be unrolled from a first supply roll before the analysis is carried out and rolled up onto a second supply roll after the analysis has been carried out, thus enabling the process to be carried out continuously.

The functional layer is preferably guided laterally in the longitudinal direction, for example, by a limiting belt so that the predefined amount of test gas can pass through a designated point in the functional layer so that incorrect measured values are reduced.

To speed up the procedure, the test gas that has passed through the functional layer is preferably actively conveyed to the detection unit. This can be done, for example, by an inert gas stream conveyed past the second surface of the functional layer and to the detection unit. A vacuum device can also be provided on the detection unit side, the vacuum device sucking in the test gas that has passed through the functional layer and is present on the second surface of the functional layer, and conveying it to the detection unit.

To establish the predefined amount of test gas to be conveyed to the first surface of the functional layer more easily, the test gas is preferably conveyed to the first surface of the functional layer at a constant or controllable pressure.

To further speed up the method and ensure that the test gas passes through the functional layer, it is advantageously provided that the test gas is conveyed to the first surface of the functional layer at an overpressure of at least 0.1 bar, in particular of at least 0.5 bar.

To minimize measurement inaccuracies, it can also advantageously be provided that the test gas is conveyed to the first surface of the functional layer at a volumetric flow of 0.1 L/min to 100 L/min. This provides a significant amount of test gas, which can be very easily determined quantitatively.

Likewise, a device that carries out the method disclosed above is also described. The device comprises a test gas chamber that conveys a predefined amount of test gas to a first surface of a functional layer and a detection unit that quantitatively determines the amount of test gas that has passed through the functional layer.

Since the device is provided to carry out the method disclosed above, additional reference is made to the corresponding statements on the method with regard to the definitions of the device-relevant features and technical details.

Thus, the test gas chamber is arranged on the first surface of the functional layer and the detection unit is arranged on the second surface of the functional layer, which second surface is opposite the first surface of the functional layer. The functional layer is therefore between the test gas chamber and the detection unit. Furthermore, the test gas chamber is open towards the first surface of the functional layer and for this purpose has an opening having a defined length in the longitudinal direction of the functional layer and a variably adjustable width in the transverse direction. The test gas can thus be conveyed to the first surface of the functional layer via an opening of predefinable size.

The device is characterized by an uncomplicated and space-saving structure and enables a reliable and rapid analysis of functional layers of electrochemical cells and electrochemical sensor applications.

Advantageously, the length of the opening may be 1 mm to 500 mm. In this example, the length is determined assuming a Cartesian coordinate system in the X direction.

Helium or a gas mixture with a helium concentration of 1 to <100% by volume is particularly suitable as a test gas since helium and gas mixtures with helium are characterized by very good diffusion properties.

The detection unit advantageously includes a mass spectrometer since not only a quantitative analysis but also a qualitative analysis can thus be carried out and any influence of foreign gases on the analysis can be ruled out or determined.

The device preferably comprises at least one lateral guide, in particular at least one guide belt that guides the functional layer laterally in the longitudinal direction between the test gas chamber and the detection unit. This can prevent the functional layer to be analyzed from slipping and can facilitate localization of the test area on the functional layer. Furthermore, the guide belt ensures that no test gas can escape laterally in the sense of a bypass.

To facilitate establishing a predetermined amount of test gas to be conveyed to the first surface, the device can further advantageously comprise a pressure control device that sets and controls the pressure of the test gas and/or a dosing device that sets the volumetric flow of the test gas.

Also, advantageously in light of minimizing errors when detecting the test gas that has passed through the functional layer, a suction device is provided to actively convey to the detection unit the test gas that has passed through the functional layer.

Furthermore, the device can advantageously include a device that introduces a carrier gas to actively convey to the detection unit the test gas that has passed through the functional layer. This example is particularly advantageous in light of the example in which the detection unit comprises a mass spectrometer since the influence of the carrier gas can thus be determined separately.

Furthermore, the device can advantageously comprise a transport device that continuously guides the functional layer, using the transport device, between the test gas chamber and the detection unit. As a result, the method can be carried out continuously and quickly using the device. In addition, the functional layer can be analyzed easily and reliably at any point.

In the previous example, it is particularly advantageous if a vacuum device is also provided to generate a vacuum to suck the functional layer onto the transport device since this minimizes the influence of foreign gases on the analysis result and thus improves the reliability and accuracy of the method carried out by the device.

The device can also advantageously comprise a fixed roller core on which a movable, porous casing is arranged, the test gas chamber being arranged on the fixed roller core and the functional layer being guided on the porous casing. The porous casing can, for example, be a separate layer which can be moved about the roller core.

In addition, at least one further guide roll can be provided which improves the transport and provision of the functional layer and allows the functional layer to be placed under tension to prevent measurement errors due to the functional layer lying on the roller unevenly.

Further details, advantages and features result from the following description of examples with reference to the drawing.

Only the essential features are shown in the figures. All other features have been omitted for the sake of clarity.

Furthermore, the same reference symbols designate the same elements or components.

FIG. 1 shows in detail a schematic of a device 1 that carries out a method of analyzing a functional layer 10 of an electrochemical cell or an electrochemical sensor application in a side view. The device has a test gas chamber 2 that conveys a predefined amount of test gas to a first surface 11 of the functional layer 10 and a detection unit 3 that quantitatively determines the amount of test gas that has passed through the functional layer 10.

In this example, the test gas chamber 2 is arranged on the first surface 11 of the functional layer, which in the example shown in FIG. 1 represents the bottom of the functional layer 10 and extends in the XZ direction.

The detection unit 3 is arranged on a second surface 12 of the functional layer 10. The second surface 12 lies opposite the first surface 11 of the functional layer 10 and, in the example shown in FIG. 1, forms the top side of the functional layer 10, which also extends in the XZ direction.

The test gas chamber 2 is open to the first surface 11 of the functional layer 10. It has an opening 2a, which has a defined length in the longitudinal direction X of the functional layer 10, that is to say in the example shown here in the direction of passage of the device, and a variably adjustable width running in the Z direction. The test gas chamber 2 is thus in contact with the first surface 11 of the functional layer 10 by the opening 2a. The opening can have a length of 1 mm to 500 mm, for example.

The test gas chamber 2 contains a test gas which can be supplied to the test gas chamber 2, for example, from the outside. The test gas is preferably helium or a gas mixture with a helium concentration of 1 to <100% by volume.

A predefined amount of test gas is conveyed to the first surface 11 of the functional layer 10 to carry out the method. For this purpose, the test gas can be subjected to a pressure of at least 0.1 bar, for example, and the device 1 advantageously includes a pressure control device that sets and controls the pressure of the test gas and/or a dosing device that sets the volumetric flow of the test gas.

The test gas leaves the test gas chamber 2 and diffuses through the functional layer 10 in the layer thickness direction Y. To accelerate the transport of the test gas that has passed through the functional layer 10 to the detection unit 3, the device 1 can have a suction device 7 to actively convey the test gas that has passed through the functional layer 10 to the detection unit 3. The test gas arrives at the second surface 12 of the functional layer 10. There, the detection unit 3 quantitatively determines the amount of test gas that has passed through the functional layer 10. For this purpose, the detection unit 3 can comprise a mass spectrometer 4, which determines the components of the test gas so that the composition of the test gas and also foreign gases can be determined. The result determined by the detection unit 3 can also be displayed on a display device.

If, for example, there is a defect at a point of the functional layer 10 to be analyzed such as a hole, a perforation or a crack, test gas will flow faster from the first surface 11 of the functional layer 10 to the second surface 12. In other words, more test gas diffuses through the functional layer 10 per unit of time than at defect-free locations of the functional layer 10. This can be determined quantitatively and can be related to the presence of a defect in the functional layer.

The device 1 is characterized by a compact design and enables a functional layer 10 of an electrochemical cell or an electrochemical sensor application to be analyzed quickly and reliably. In particular, membranes, catalyst layers, catalyst-coated membranes and catalyst-coated membrane, polymer film and gas diffusion layer composites come into consideration as functional layers 10.

As shown in FIG. 1, the functional layer 10 can be guided on a transport device 5. The transport device 5 serves to continuously guide the functional layer 10 between the test gas chamber 2 and the detection unit 3. Lateral guides 6 can be provided on the transport device 5, in particular in the form of a guide belt so that the functional layer 10 is guided laterally in the longitudinal direction X and slipping is prevented. To improve the fixation of the functional layer 10 on the transport device 5, a vacuum device that generates a vacuum that sucks the functional layer 10 onto the transport device 5 can be provided.

In the area of the test gas chamber 2 the transport device 5 has a corresponding recess so that the test gas can diffuse unhindered from the test gas chamber 2 to the first surface 11 of the functional layer 10.

The device 1 has a compact design with high functionality and enables a reliable and rapid analysis of the functional layer 10 for defects.

Figure 2:
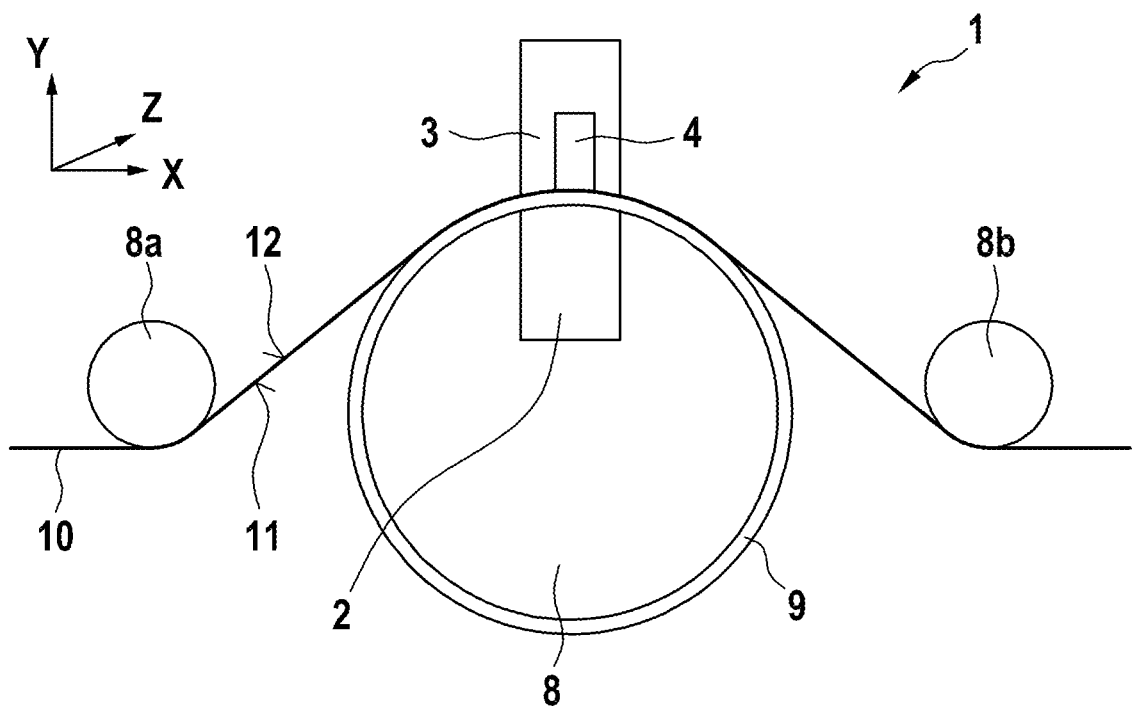
FIG. 2 shows a schematic side view of a device according to a second example.

FIG. 2 shows a second example of the device 1. In the second example, the device 1 comprises, instead of a transport device 5, a fixed roller core 8 on which a movable, porous casing 9 is arranged. The test gas chamber 2 is arranged on the stationary roller core 8.

In this example, the functional layer 10 is guided on the porous casing 9 of the fixed roller core 8. In addition, the functional layer is guided on two further guide rolls 8a and 8b, as a result of which the functional layer 10 can be put under tension.

The method of analyzing the functional layer 10 for defects can be carried out analogously to that shown in the device 1 from FIG. 1. The functional layer 10 is guided between the test gas chamber 2 and the detection unit 3 via the guide rolls 8a and 8b and the porous casing 9. In this area, test gas from the test gas chamber 2 is conveyed onto the first surface 11 of the functional layer 10, passes through the functional layer in layer thickness direction Y and reaches the second surface 12, in the immediate vicinity of which the detection unit 3 is arranged. The test gas that has passed through the functional layer 10 is determined quantitatively by the detection unit 3 so that the determined amount of test gas that has passed through the functional layer 10 can also be used in this examples to indicate the presence of defects in the functional layer.

For calibration purposes, in both examples, the device 1 can first analyze a defect-free area of the functional layer 10 to be examined using the method so that a comparative value for the amount of test gas that has passed through and possibly also the time required for this can be determined.

The device of the second example is also characterized by a compact but highly functional design.

In addition to the above written description, explicit reference is hereby made to the graphic representation of our devices and methods in FIGS. 1 and 2 for the purposes of expanding this disclosure.

The invention claimed is:

1. A method of analyzing a functional layer of an electrochemical cell or an electrochemical sensor application, comprising:
conveying a predefined amount of test gas to a first surface of the functional layer, and
quantitatively determining an amount of test gas that has passed through the functional layer using a detection unit located on a second surface of the functional layer, which second surface is opposite the first surface of the functional layer, wherein the test gas conveyed to the first surface of the functional layer is provided in a test gas chamber arranged on the first surface of the functional layer, characterized in that the test gas chamber is open towards the first surface of the functional layer via an opening, the opening being defined by the length in the longitudinal direction and the width in the transverse direction of the test gas chamber, wherein the opening has a defined length in the longitudinal direction (X) of the functional layer and a variably adjustable width in the transverse direction (Z).

2. The method according to claim 1, wherein the functional layer is provided on a transport device arranged between the detection unit and the test gas chamber, the transport device having a recess having the same dimensions as the opening of the test gas chamber.

3. The method according to claim 2, wherein the functional layer is passed between the test gas chamber and the detection unit continuously by the transport device at a speed of 0.2 m/min to 50 m/min.

4. The method according to claim 2, wherein the functional layer is sucked onto the transport device by a vacuum.

5. The method according to claim 1, wherein the functional layer is guided over a fixed roller core on which a movable, porous casing is arranged, the test gas chamber being arranged on the fixed roller core, and the functional layer being guided in particular over at least one further guide roll.

6. The method according to claim 1, wherein the functional layer is guided laterally in the longitudinal direction (X) and/or the test gas that has passed through the functional layer is actively conveyed to the detection unit, and/or the test gas is conveyed to the first surface of the functional layer at a constant or controllable pressure, and/or the test gas is conveyed to the first surface of the functional layer at an overpressure of at least 0.1 bar, and/or the test gas is conveyed to the first surface of the functional layer at a volumetric flow of 0.1 L/min to 100 L/min.

7. A device for carrying out the method according to claim 1, comprising:

a test gas chamber that conveys a predefined amount of test gas to a first surface of a functional layer, and a detection unit that quantitatively determines the amount of test gas that has passed through the functional layer, wherein the test gas chamber is arranged on the first surface of the functional layer and the detection unit is arranged on a second surface of the functional layer, which second surface is opposite the first surface of the functional layer, characterized in that the test gas chamber is open towards the first surface of the functional layer and has an opening that has a defined length in the longitudinal direction (X) of the functional layer and a variably adjustable width in the transverse direction (Z).

8. The device according to claim 7, wherein the opening has a length of 1 mm to 500 mm, and/or the test gas is helium or a gas mixture with a helium concentration of 1 to <100% by volume, and/or the detection unit comprises a mass spectrometer, and/or further comprises at least one lateral guide or at least one guide belt to laterally guide the functional layer in the longitudinal direction (X), and/or further comprising a pressure control device to set and control the pressure of the test gas and/or a dosing device that sets the volumetric flow of the test gas, and/or further comprising a suction device to actively convey the test gas that has passed through the functional layer to the detection unit, and/or further comprising a device that introduces a carrier gas to actively convey the test gas that has passed through the functional layer to the detection unit.

9. The device according to claim 7, further comprising a transport device that continuously guides the functional layer, by the transport device, between the test gas chamber and the detection unit, the device being a vacuum device that generates a vacuum that sucks the functional layer onto the transport device.

10. The device according to claim 7, further comprising a fixed roller core on which a movable, porous casing is arranged, the test gas chamber being arranged on the fixed roller core and the functional layer being guided on the porous casing, the device further comprising at least one further guide roll.

* * * * *